United States Patent [19]

Nishida et al.

[11] 4,347,172

[45] Aug. 31, 1982

[54] PROCESS AND COMPOSITION FOR COATING METALS

[75] Inventors: Takao Nishida; Takashi Hirohata, both of Osaka, Japan

[73] Assignee: Amchem Products, Inc., Ambler, Pa.

[21] Appl. No.: 150,082

[22] Filed: May 15, 1980

Related U.S. Application Data

[60] Division of Ser. No. 797,758, May 17, 1977, abandoned, and a continuation-in-part of Ser. No. 445,434, Feb. 25, 1974, abandoned, which is a continuation of Ser. No. 232,625, Mar. 7, 1972, abandoned.

[30] Foreign Application Priority Data

Mar. 10, 1971 [JP] Japan ............................. 46/012462

[51] Int. Cl.$^3$ ........................ C08L 9/06; C08L 23/06
[52] U.S. Cl. ................... 524/319; 524/419; 524/429; 524/435; 524/431; 524/417; 524/575
[58] Field of Search ............... 260/29.6 M, 29.6 MM, 260/29.7 M; 427/309; 148/6.2

[56] References Cited

U.S. PATENT DOCUMENTS

| | | | |
|---|---|---|---|
| 3,709,743 | 1/1973 | Dalton et al. | 427/309 |
| 3,791,431 | 2/1974 | Steinbrecher et al. | 427/309 |
| 3,839,097 | 10/1974 | Hall et al. | 148/6.2 |
| 3,936,546 | 2/1976 | Hall | 427/375 |
| 4,160,756 | 7/1979 | Nishida et al. | 260/29.6 MM |

FOREIGN PATENT DOCUMENTS 1043577 1/1966 United Kingdom .
1241991 8/1971 United Kingdom .

*Primary Examiner*—Lewis T. Jacobs
*Attorney, Agent, or Firm*—Alexis Barron

[57] ABSTRACT

Method and composition for applying an organic coating to a metallic surface, the surface being contacted with an acidic aqueous coating composition comprising an organic coating-forming material, fluoride, and ferric iron, wherein the thickness and/or weight of the coating formed on the surface can be controlled by varying the time the surface is immersed in the composition.

34 Claims, No Drawings

4,347,172

PROCESS AND COMPOSITION FOR COATING METALS

CROSS-REFERENCE TO RELATED APPLICATIONS

This application is a continuation of application Ser. No. 797,758, filed May 17, 1977, now abandoned, and a continuation-in-part of application Ser. No. 445,434, filed Feb. 25, 1974 (now abandoned) which in turn was a continuation of application Ser. No. 232,625, filed Mar. 7, 1972 (now abandoned).

FIELD OF THE INVENTION

This invention relates to an aqueous composition which is effective in forming an organic coating on a substrate. More specifically, this invention relates to an acidic aqueous coating composition of the type which is effective in forming on a metallic surface an organic coating which increases in thickness or weight the longer the surface is immersed in the composition.

REPORTED DEVELOPMENTS

It is known that a composition comprising resin solids dispersed in water (for example, a latex) will form on a metallic surface immersed therein a resinous coating whose thickness is the same regardless of the time the surface is immersed in the composition. In order to obtain thicker coatings when using such a composition, it has been necessary to subject the metallic surface to multiple stage coating operations or to increase the resin solids content of the composition. In addition, coatings formed from such compositions ordinarily do not initially resist rinsing until after they have been dried or fused, that is, the wet coatings are removed readily from the substrate when they are rinsed with water.

Coating compositions which have properties which the aforementioned type compositions lack and which have other desirable properties are described in the two patents hereafter discussed. U.S. Pat. No. 3,585,084 to Steinbrecher and Hall, assigned to the same assignee as the present invention, discloses acidic aqueous compositions for coating metallic surfaces comprising an organic coating-forming material and an oxygen-containing oxidizing agent. Preferred acidic aqueous coating compositions of this type and comprising a resin dispersion, fluoride and an oxidizing agent selected from the group consisting of hydrogen peroxide and dichromate are claimed in U.S. Pat. No. 3,592,699 also to Steinbrecher and Hall, and assigned to the same assignee as the present invention. The weights of coatings produced employing compositions of this kind are within limits a function of the time the surfaces are immersed in the composition. Also such coatings are resistant to water-rinsing prior to their being baked.

Although the rate at which the aforementioned compositions form coatings can be changed by varying the concentration of hydrogen ion or oxidizing agent therein, it has been found that this can adversely affect the uniformity and appearance of the coatings, as well as the stability of a working bath of composition.

It is noted further that during use of the aforementioned type compositions metal of the substrate being coated is dissolved by the acidic composition and such dissolved metal tends to build-up in concentration in the composition. If steps are not taken to cope with metal buildup (for example, by removing from the composition excessive amounts of the dissolved metal), the properties of the composition are adversely affected. An early manifestation of problems which are caused by undesirable metal buildup is that the coatings formed from the composition have reduced thicknesses. If the buildup is allowed to continue, the composition may destabilize, as manifested by flocculation, coagulation or gelling of the organic coating-forming materials in the composition. Maintaining baths of the aforementioned type compositions in satisfactory operating condition requires quite rigorous control of metal buildup and replenishment of ingredients comprising the composition.

OBJECTS

It is an object of the present invention to provide an improved process for forming an organic coating on a metallic surface.

Another object of the present invention is to provide an acidic aqueous coating composition capable of forming on a metal surface an organic coating whose weight is a function of the time the surface is immersed in the composition.

It is another object of this invention to provide coating compositions capable of forming organic coatings on metallic surfaces and exhibiting improved properties with respect to control of the rate at which coatings are formed.

It is another object of this invention to provide an acidic aqueous coating composition capable of forming on metallic surfaces immersed therein organic coatings whose weight or thicknesses are a function of the time the surfaces are immersed in the composition and exhibiting improved stability properties during use.

SUMMARY OF THE INVENTION

In accordance with this invention, there is provided an acidic aqueous coating composition comprising dispersed particles of resin and dissolved ferric iron and fluoride. Compositions within the scope of the present invention are capable of forming on metallic surfaces uniform smooth organic coatings in a relatively short period of time and coatings which increase in thickness or weight the longer the surface is immersed in the composition.

It has been mentioned above that compositions of the type described in the aforementioned patents dissolve metal from metallic substrates contacted therewith. For example, when coating an iron or steel article with a composition containing HF and $H_2O_2$, iron is dissolved from the substrate and then oxidized from ferrous iron to ferric iron. Viewed in one way, a distinguishing characteristic of the composition of the present invention is that it contains dissolved ferric iron from a source other than the substrate that is being coated. As will be described in more detail below, the composition of the present invention can be prepared from a ferric-containing material which is soluble in the composition.

Compositions within the scope of the present invention can be more readily controlled to maintain them in satisfactory operating condition during use. Speaking generally, compositions within the scope of the present invention function in a manner such that relatively small amounts of the metallic surface being coated are dissolved for the amount of coating formed. Another desirable characteristic of compositions within the scope of the present invention is that its rate of coating formation is relatively high. In addition, the rate at which the composition forms a coating can be controlled readily by the amount of ferric iron added to the composition in the form of a ferric-containing compound which is soluble in the composition.

The process of the present invention can be carried out in a substantially electrostatic field-free environment. Thus, the use of electricity and the equipment and control instruments required to operate an electrocoat process can be avoided when practicing the present invention.

The term "ferrous metal surface", as used herein, refers to surfaces comprising a wide variety of steels, iron, and iron alloys, including, for example, alloys of iron and chromium and/or nickel.

DETAILED DESCRIPTION OF THE INVENTION

Essential ingredients of the composition of the present invention are water, resin solids dispersed in the aqueous phase of the composition, acid, fluoride and ferric iron.

The source of the dispersed particles of resin will ordinarily be a latex of the resin. Latices, that is, dispersions of insoluble resin particles in water, are readily available and those sold commercially can be used in the practice of the invention. Commercially available latices usually contain other ingredients such as, for example, emulsifiers and protective colloids.

Examples of commercially available latices which can be regarded as the preferred materials for use in the compositions of this invention are:

HYCAR LX 407—(manufactured by Nihon Geon Co., Ltd.) . . . styrene-butadiene copolymer
Goodrite 1800×72—(manufactured by Goodrich Chemical Corp.) . . . styrene-butadiene copolymer
Pliolite 491—(manufactured by Goodyear Rubber and Chemical Corp.) . . . styrene-butadiene copolymer
HYCAR LX 814—(manufactured by Nihon Geon Co., Ltd.) . . . acrylic copolymer
SYNTHEMAL 9404—(manufactured by Nihon Reichhold Co., Ltd.) . . . acrylic copolymer
Polysol AP 300—(manufactured by Kobunshi Kagaku Kogyo Co., Ltd.) . . . acrylic copolymer
Polysol EVA P 1—(manufactured by Kobunshi Kagaku Kogyo Co., Ltd.) . . . ethylene-vinyl acetate copolymer
Poly-em 40—(manufactured by Gulf Oil Corp.) . . . polyethylene.

Other coating-forming resin dispersions or emulsions can be employed so long as the latex is stable in the presence of the other ingredients comprising the composition.

The amount of dispersed resin particles employed in the coating composition will depend on the amount of resin which can be dispersed therein and the amount needed to provide sufficient resinous material to form a coating. The concentration of dispersed resin can vary over a wide range such as about 5 to about 550 g/l of resin. It should be understood that the volume of latex needed to provide the desired amount of resin in the composition will depend on the specific amount of resin solids dispersed in the selected latex.

For the coating process of the present invention to be effected, the concentration of dissolved ferric iron in the coating composition should be at least about 0.025 g/l, for example, about 0.025 g/l to about 3.5 g/l or more, the ferric iron being present in dissolved form.

Preferably, the concentration of dissolved ferric iron should be from about 0.3 g/l to about 1.6 g/l.

A wide variety of iron compounds can be employed in the practice of the present invention. Examples of such compounds include ferric fluoride, ferric nitrate, ferric chloride, ferric sulfate, ferric phosphate, and ferric oxide. The ferric-containing material should be present in the composition in an amount which will result in a dissolved ferric iron concentration as described above.

The soluble ferric-containing compound can be one which is readily soluble in the acidic aqueous composition or it can be a material which is slowly or partially soluble in the composition. The term "readily soluble" refers to solubility properties of the type possessed by materials such as ferric nitrate, ferric chloride and ferric fluoride, all of which dissolve quickly in the acidic composition. The term "slowly soluble" or "partially soluble" refers to solubility properties of the type possessed by materials such as ferric phosphate and ferric oxide. As is pointed out in the examples, compositions formulated from ferric-containing compounds which dissolve relatively slowly should be allowed to age before use. The aging results in dissolution of ferric iron.

The acid to be employed in the composition of the present invention can be an inorganic or an organic acid. Typical examples of inorganic acids that can be employed are sulfuric, hydrochloric, hydrofluoric, nitric, and phosphoric acid. Examples of organic acids that can be employed are acetic, chloracetic, and trichloracetic acid. The acid to be employed in the process of the present invention must be present in sufficient quantity to maintain the pH of the solution at its desired level. The pH of the coating composition should be maintained at a level within the range of from about 1.6 to about 5.0.

It should be understood that the acid employed in the composition will dissociate to yield hydrogen ion and an anion. It has been observed that particularly good results are obtained when the acid employed in the coating composition is hydrofluoric acid. Accordingly, the preferred method of making the composition acidic comprises the use of hydrofluoric acid, which, in addition to being a source of hydrogen ion, is also a source of fluoride. The use of hydrofluoric acid prevents the deliberate inclusion of anions which may be undesirable and detrimental to the coating process. It should be understood that hydrofluoric acid is a preferred acid to be employed in the composition, but that other acids such as those described above can be employed with satisfactory results.

A preferred embodiment of this invention comprises an aqueous composition consisting essentially of an anionically stabilized resin dispersion (negatively charged dispersed resin particles) having about 5 to about 550 g/l of resin solids, ferric fluoride in an amount equivalent to about 1 to about 5 g/l of ferric fluoride trihydrate, and an acid in an amount sufficient to impart a pH to the aqueous composition of from about 1.6 to about 5.0. As mentioned above, it is preferred to use hydrofluoric acid in preparing the composition.

In the coating operation, the metal substrate to be treated is brought into contact with the aqueous coating composition under suitable conditions of temperature and contact time. The time of treatment of the metal surface with the aqueous coating composition can be from about 15 seconds to about 10 minutes. It will be appreciated that with the use of the aqueous coating composition described herein, the weight of the deposited coating will increase with longer exposure of the metal surface to the action of the coating composition. Thus, coating weight or thickness is a function of the time of contact of the surface with the composition. For a typical industrial operation, it is believed that contact time between the metal substrate and the coating composition will be from about 30 seconds to about 5 minutes.

The coating process can be operated at temperatures from about 40° F. to about 120° F. It is preferable to operate the coating bath at ambient temperature, that is, from about 60° F. to about 90° F. Generally, a slight change in the temperature of the aqueous coating composition will not necessitate substantial alteration of treating time and concentration parameters.

The process of the present invention can be effected by employing known contacting techniques. Contact can be effected by either immersion or flow-coating to produce the desired surface coating. Preferably, the aqueous coating composition will be contacted with the metal surface by conventional immersion methods.

After contact with the composition, the coated metal surface can be subjected to further processing steps as are known. Such steps are described briefly hereafter.

Water rinsing the coated surface after it has been withdrawn from the composition, and before significant drying takes place is effective in removing therefrom residuals such as acid and other ingredients of the composition that adhere to the coated surface. If such residuals are allowed to remain on the coated surface, they may change or adversely affect the quality of the coating. For a specific application, a determination can be made as to whether the residuals cause adverse effects which are not tolerable. If they do, they should be removed, for example, by water rinsing with tap or deionized water. If they do not, this step of removing them can be eliminated.

Prior to any water rinse, and after contact with the composition, the coated surface can be exposed to air, for example, for a time of about 15 seconds to about 10 minutes. This can aid in providing a tight, adherent, and more uniform coating. It should be understood that the time of exposure to air should not be long enough to allow the deposited coating to dry prior to rinsing. The exposure time to be employed will depend somewhat on the type of resin utilized to form the coating.

If desired, the corrosion resistant properties of the coated surface can be improved by contacting the coated surface with an acidic aqueous rinse solution containing hexavalent chromium. Such rinse solutions can be prepared from chromium trioxide or a water soluble dichromate or chromate salt, for example, ammonium, sodium and potassium salts. There can also be used a chromium composition obtained by treating a concentrated aqueous solution of chromic acid with formaldehyde to reduce a portion of the hexavalent chromium. This type of rinse composition, which is described in U.S. Pat. No. 3,063,877 to Schiffman, contains chromium in its hexavalent state and reduced chromium in aqueous solution. It has been reported also that the water and salt spray resistance of a fused resinous coating can be improved by contacting the unfused coating with a solution, preferably an aqueous solution, of phosphoric acid (see U.S. Pat. No. 3,647,567). The recommended amount of phosphoric acid in the solution is about 0.25 to about 7 wt.% based on the total weight of the solution.

Following any rinse steps employed after the coated surface is withdrawn from the composition, the coating should be dried. Fusion of the resinous coating renders it continuous, thereby improving its resistance to corrosion and adherence to the underlying metal surface.

The conditions under which the drying and/or fusion operation is carried out depend somewhat upon the type of resin employed. In general, heat will be required to fuse the resin. The corrosion resistant properties of coatings fused at elevated temperature have been observed to be better than coatings which have been air dried. However, there are applications where air dried coatings can be used satisfactorily. The fusion of the coating should be carried out below temperatures which cause the resinous coating to degrade. Exemplary conditions used in fusing coatings produced according to the present invention are temperatures within the range of about 150° F. to about 500° F. or higher. It should be understood that the temperature employed will depend to some extent on the type of resin and the drying time used.

The aqueous coating compositions of the present invention described hereinabove are capable of producing coatings on a metal surface which portray excellent adhesion to the surface and have excellent corrosion resistant properties. There follows a description of optional materials that can be included in the composition.

An oxidizing agent which is soluble in the composition is an optional ingredient that can be incorporated into the composition. Typical examples of oxidizing agents that can be used are hydrogen peroxide, dichromate, permanganate, nitrate, persulfate, and perborate. Such oxidizing agents are oxygen-containing materials which have a positive reduction potential greater than that of hydrogen and function as oxidizing agents in the acidic aqueous composition of the present invention. (The reduction potential of hydrogen is zero as measured by a platinum electrode immersed in an acidic solution in combination with bubbling hydrogen gas. See pages 1215 to 1218 of *Handbook of Chemistry* by Lange, N. A., Ninth Edition, published by Handbook Publishers, Inc., 1956 and see Chapter 1 of *Oxidation Potentials* by Latimer, W. M., Second Edition, Prentice-Hall, Inc., 1952.)

The addition of an oxidizing agent to the composition in an amount sufficient to provide from about 0.01 to about 0.2 of oxidizing equivalent per liter of composition can increase the rate at which the composition forms coatings and can result in the formation of coatings having improved corrosion resistance. (The term "oxidizing equivalent" when used herein means the number of grams of oxidizing agent used divided by the equivalent weight of the oxidizing agent. The equivalent weight of the oxidizing agent is the gram molecular weight of the agent divided by the change in valence of all atoms in the molecule which change valence, usually one element.)

The use of the optional oxidizing agent can increase the rate at which metal is dissolved from the substrate. For some applications this may be considered undesirable because of the procedures needed to control metal build-up in order to maintain the stability of the composition. For such applications it is recommended that the composition of the present invention be substantially free of materials that effect an increase in the rate of metal dissolution, that is, metal dissolution should be effected substantially exclusively by the acid and dissolved fluoride and ferric constituents. In this respect, a characteristic of the present composition which distinguishes it from the compositions described in the forementioned patents is that it is substantially free of oxygen-containing oxidizing agents effecting an increase in the rate of metal dissolution. By way of further explanation, it is known that the addition of acid to an aqueous dispersion of resin particles can result in a coating composition which is effective in chemically attacking the surface of a metallic substrate and dissolving metal therefrom (for example, see British Pat. No. 1,099,461). It is known also that the rate of metal dissolution of such types of acidic aqueous coating compositions can be increased by adding thereto oxidizing agents, such as taught in the aforementioned U.S. patents. Viewed in this light, the use according to the present invention of dissolved ferric and fluoride effects an increase in metal dissolution, relative to the use of acid only, and in a manner such that various advantages can be realized compared to the use of other types of materials which effect an increase in metal dissolution.

A coalescing agent can be incorporated into the aqueous coating composition. The addition of a coalescing agent can further enhance the appearance and the corrosion resistant qualities of the deposited coating. A typical example of a coalescing agent which can be employed is ethylene glycol monobutyl ether. The coalescing agent can be present in the composition in an amount from about 5 g/l to about 30 g/l.

The coating composition of the present invention may be formulated so as to incorporate water dispersible pigments known to the art. Variations in the color of the deposited coating can be realized by adding pigments such as phthalocyanine blue, phthalocyanine green, carbon black, quinacridone red, iron oxide red, iron oxide yellow, lead chromate, and chrome oxide green. These pigments provide excellent color variations with no sacrifices in coating quality or corrosion resistance.

To assure satisfactory wetting of the metallic surface during treatment with the coating composition, it may be desirable to incorporate into the composition a small amount of wetting agent or surface active agent. Preferably, nonionic type wetting agents should be employed. Typical examples of wetting agents which can be utilized are alkyl phenoxy polyethoxy ethanol and sodium salts of alkylaryl polyether sulfonate.

Should a dry pigment be used, it can be dispersed in the aqueous coating composition by conventional procedures, such as by mixing the pigment with a small amount of nonionic or anionic surface active agent and water, agitating the mixture with a high speed mixer, and then adding the pigment/surface active agent mixture to the other ingredients comprising the composition with further agitation.

A pigment, such as iron oxide red or iron oxide yellow, which is partially soluble in the acidic aqueous coating composition can be employed as a source of dissolved ferric iron. Should a pigment be used as a source for ferric iron, it must be added in an amount sufficient to provide the needed amount of dissolved ferric iron in the composition.

The following is offered as an explanation of the manner in which the composition of the present invention possibly functions in coating a ferrous metal surface. It is believed that the dispersed organic solids in the region of the ferrous surface are destabilized by ferrous ions which are produced by the reaction of the iron-containing surface with various chemical species contained within the composition in dissolved form. It is probable that dissolved chemical species contained within the composition include the following, irrespective of the specific source used for the ferric iron, fluoride and acid: $H^+$, $Fe^{+3}$ (probably in a very small amount), various dissolved forms of ferric fluoride including $FeF_3$, $FeF_2^+$, $FeF^{++}$, undissociated HF, $F^-$ and $FHF^-$.

It is believed also that of the above species, the following react with the iron-containing surface to produce ferrous iron, which is responsible for the deposition of the dispersed organic solids on the substrate, according to the following reactions:

$$2FeF_2^+ + Fe^0 \rightarrow Fe^{++} + 2FeF_2$$

$$2FeF^{++} + Fe^0 \rightarrow Fe^{++} + 2FeF^+$$

$$2Fe^{+++} + Fe^0 \rightarrow 3Fe^{++}$$

$$H^+ + Fe^0 \rightarrow Fe^{++} + \tfrac{1}{2}H_2 + e^{\ominus}$$

The concentration of ferric ion ($Fe^{+++}$) in the composition is believed to be very small with substantially all of the ferric iron being tied up with fluoride in the form of various dissolved complex fluorides.

It should be understood that the above is an explanation of possible mechanisms involved in the coating-forming operation.

EXAMPLES

A series of examples are presented hereafter showing the formulation and use of particular aqueous coating compositions within the scope of the present invention. It will be observed that some of the examples include the use of various optional additives which have been found to be suitable for use in the compositions. The examples presented below are illustrative of the invention and should not be considered as excluding from the invention the use of other materials and operative conditions falling within the scope of the claims.

DESCRIPTION OF TESTS

In some of the examples below, coated test panels were subjected to corrosion tests and adhesion tests.

When salt spray corrosion tests were run on coated panels, they were scribed so that base metal was exposed. Panels were subjected to 5% salt spray and were rated in accordance with ASTMB-1654-61 by measuring the average failure of the coating from the scribe.

Adhesion tests were run on coated panels using impact and cross-hatch test procedures which are commonly employed in the evaluation of paint films.

In the impact test, the test surface was deformed by the impact of a falling ½" ball having a force of 50 kilogram centimeters. Subsequent to impact, the deformed surface is inspected for loose or cracked paint, usually on the reverse side of the impact, and the rating of the coated panel is expressed in inches of paint failure.

In the cross-hatch test, the coated surface is scribed with parallel lines, approximately 1 millimeter apart, cut through to bare metal. Duplicate lines are scribed at right angles to make a cross-hatch pattern. Scotch brand cellophane tape is pressed smoothly over the scribed area. After several seconds, the tape is pulled back rapidly so that the tape is turned back upon itself approximately 180° from its original pressed position. Results are reported in the degree of failure noted, that is, none, slight, moderate, or heavy loss of coating.

EXAMPLE 1

Steel panels, cleaned in a conventional alkali metal silicate cleaning solution, were immersed for 3 minutes in an aqueous coating composition comprising the following constituents:

| Components | Amount |
|---|---|
| styrene-butadiene resin (HYCAR LX 407 latex) | 180 g |
| hydrofluoric acid | 3 g |
| ferric fluoride trihydrate | 10 g |
| water | to make 1 liter. |

HYCAR LX 407 latex was employed as the source for the styrenebutadiene resin (manufactured by Nihon Geon Co. Ltd., and containing 48% resin solids). The aqueous composition was prepared by mixing the latex with water, and adding hydrofluoric acid and ferric fluoride trihydrate with continuous agitation.

The test panels were removed from the coating bath and dried in an oven at 180° C. for 5 minutes. Under these conditions, the resinous coating was also fused. The average thickness of the coatings formed on the panels was 25 microns. The coatings were observed to be smooth and uniform.

EXAMPLES 2–6

These examples illustrate the use of various iron compounds as the source of ferric iron in the aqueous coating composition. The constituents comprising the compositions are identified below in Table 1, along with the measured average thickness of the coatings formed by the compositions.

TABLE 1

| Ex. No. | Latex Used, Resin Therein & Amount | Source of Ferric Iron & Amount | Acid & Amount | | Average Coating Thickness in Microns |
|---|---|---|---|---|---|
| 2 | HYCAR LX 407, styrene-butadiene, 180 g | ferric chloride, 10 g | HF, 3 g | water to make 1 liter | 15 |
| 3 | HYCAR LX 407, styrene-butadiene, 180 g | ferric nitrate nonahydrate, 6 g | HF, 3 g | water to make 1 liter | 32 |
| 4 | HYCAR LX 407, styrene-butadiene, 180 g | ferric sulfate, 10 g | HF, 3 g | water to make 1 liter | 10 |
| 5 | HYCAR LX 407, styrene-butadiene, 180 g | ferric phosphate tetrahydrate, 45 g | HF, 3 g | water to make 1 liter | 20 |
| 6 | HYCAR LX 407, styrene-butadiene, 180 g | ferric oxide, 80 g | HF, 3 g | water to make 1 liter | 15 |

The compositions of Examples 2 to 6 were prepared as set forth in Example 1, except that different sources for ferric iron were employed in each case.

Steel test panels were cleaned in a conventional alkali metal silicate cleaning solution, then immersed in the respective coating compositions set forth in Table 1 for 3 minutes. The pH of each composition was between 1.6 and 5.0. After withdrawing the coated panels from the composition, the coatings were dried and fused in an oven at 180° C. for 5 minutes. The average thickness of the coating on each of the test panels was measured and is noted in Table 1 above.

As to those compositions formulated from ferric phosphate and ferric oxide, it is noted that these iron compounds were milled in a pot mill for about 16 hours in the presence of a surface active agent and water prior to their addition to their respective compositions. This was done because these iron compounds are only partially soluble in the composition. It is noted also that the coating composition containing ferric oxide (that of Example 6) was allowed to stand for 3 days before use.

EXAMPLE 7

This example shows the effect on the rate of coating formation when ferric nitrate is included in a composition of the type described in the above mentioned U.S. Pat. No. 3,592,699.

| (U.S. Pat. No. 3,592,699) Bath A | | (present invention) Bath B | |
|---|---|---|---|
| Component | Amount | Component | Amount |
| styrene-butadiene resin (HYCAR LX 407 latex) | 180 g | styrene-butadiene resin (HYCAR LX 407 latex) | 180 g |
| hydrofluoric acid | 3 g | hydrofluoric acid | 3 g |
| hydrogen peroxide | 2.5 g | hydrogen peroxide | 2.5 g |
| water | to make 1 liter | $Fe(NO_3)_3 \cdot 9H_2O$ | 10 g |
| | | water | to make 1 liter |

Steel panels were immersed in the above composition for 3 minutes, removed therefrom, and then dried and cured in an oven at 160° C. for 10 minutes. The average coating thickness of the panel coated with Bath B was 40 microns and that of the panel coated with Bath A was 20 microns.

EXAMPLES 8–14

Steel test panels were immersed in the aqueous coating compositions set forth in Table 2 below for a period of 3 minutes and the coatings of the panels were then dried and cured in an oven at 180° C. for 5 minutes. Average coating thicknesses are listed in Table 2.

As to the composition (Example 13) formulated from ferric phosphate, it is noted that this iron compound is only partially soluble in the composition. Accordingly, it was added to the composition after it was milled in a pot mill for about 16 hours in the presence of a surface active agent and water.

It is noted also that a number of the compositions described below contain optional constituents. The compositions of Examples 8 and 9 include oxygen-containing oxidizing agents and that of Example 11 includes a coalescing agent.

TABLE 2

| Ex. No. | Latex Used, Resin Therein & Amount | Source of Ferric Iron & Amount | Acid & Amount | Other Ingredients & Amount | | Coating Thickness in Microns |
|---|---|---|---|---|---|---|
| 8 | HYCAR LX 407, styrene-butadiene, 150 g | $FeF_3 \cdot 3H_2O$ 6 g | HF, 3 g | hydrogen peroxide 2 g | water to make 1 liter | 23 |
| 9 | HYCAR LX 407, styrene-butadiene, 220 g | $Fe(NO_3)_3 \cdot 9H_2O$ 2 g | HF, 3 g | chromic acid 2 g | water to make 1 liter | 30 |
| 10 | HYCAR LX 407, styrene-butadiene, 180 g | $FeF_3 \cdot 3H_2O$ 5 g | $HNO_3$, 4 g | | water to make 1 liter | 21 |
| 11 | HYCAR LX 407, styrene-butadiene, 180 g | $FeF_3 \cdot 3H_2O$ 10 g | HF, 4 g | butyl Cellosolve 20 g | water to make 1 liter | 15 |
| 12 | Goodrite 1800 × 72, styrene-butadiene, 200 g | $FeF_3 \cdot 3H_2O$ 10 g | HF, 2 g | | water to make 1 liter | 45 |
| 13 | Goodrite 1800 × 72, styrene-butadiene, 200 g | $Fe(PO_4) \cdot 4H_2O$ 20 g | HF, 2 g | | water to make 1 liter | 42 |
| 14 | Synthemal 9404, acrylic copolymer, 200 g | $Fe(NO_3)_3 \cdot 9H_2O$ 3 g | HF, 3.5 | | water to make 1 liter | 20 |

EXAMPLE 15

This example is illustrative of a pigmented coating composition within the scope of the present invention. Steel panels were cleaned in a conventional alkali metal silicate solution and then immersed in the composition described below for 3 minutes. The coated panels were then dried and cured in an oven at 200° C. for 5 minutes.

| Component | Amount |
|---|---|
| styrene-butadiene (HYCAR LX 407 latex) | 180 g |
| lead chromate pigment (KIKU-JIRUSHI G, manufactured by Kikuchi Kogyo) | 95 g |
| anionic surface active agent (Demol-P) | 5 g |
| hydrofluoric acid | 3.5 g |
| ferric fluoride trihydrate | 10 g |
| water | to make 1 liter |

In formulating the composition, the lead chromate pigment and anionic surface active agent and water were mixed together and milled for 16 hours prior to being combined with the other ingredients comprising the composition.

The average thickness of the coatings, which were observed to be smooth and uniform, was 35 microns.

EXAMPLE 16

This example shows the use of coating compositions containing different amounts of ferric iron and the effect ferric iron concentration has on the thickness of the coatings formed.

One set of steel test panels was contacted with Bath No. 1 described below for 3 minutes and the coated panels were then dried and cured in an oven at 180° C. for 5 minutes. The average thickness of the coatings formed was 18 microns. It should be noted that the source for ferric iron in Bath No. 1 was the partially soluble iron oxide red pigment.

| Bath No. 1 | |
|---|---|
| Component | Amount |
| styrene-butadiene resin (HYCAR LX 407 latex) | 180 g |
| lead chromate | 50 g |
| iron oxide red | 40 g |
| hydrofluoric acid | 3 g |
| hydrogen peroxide | 2 g |
| water | to make 1 liter |

To the composition of Bath No. 1, quantities of ferric fluoride trihydrate were added as indicated in Table 3 below and after each addition, steel panels were immersed and treated as set forth above. Table 3 shows the average thickness of the coatings formed.

TABLE 3

| Bath No. | $FeF_3 \cdot 3H_2O$, (g/l) | Average Coating Thickness, Microns |
|---|---|---|
| 1 | — | 18 |
| 2 | 2 | 21 |
| 3 | 4 | 24 |
| 4 | 6 | 30 |
| 5 | 8 | 34 |
| 6 | 10 | 38 |

It can be appreciated from Table 3 that as the ferric iron concentration was increased, the average thickness of the coating increased. The results shown in Table 3 illustrate a most important aspect of the present invention, that is, the coating thickness can be controlled by the amount of ferric iron in the composition.

EXAMPLES 17-23

This group of examples shows the use of various types of latices and pigments in compositions within the scope of the present invention. Steel test panels were cleaned in a conventional alkaline metal silicate cleaning solution and were then immersed in the coating composition described in Table 4 for 3 minutes, except for Example 20 where a two minute period of immersion was used. The coated test panels were then dried and cured in an oven at 180° C. for 5 minutes. The average coating thickness was measured and is set forth in Table 4.

TABLE 4

| Ex. No. | Latex Used, Resin Therein & Amount | Source of Ferric Iron & Amount | Acid & Amount | Other Ingredients & Amount | | Coating Thickness in Microns |
|---|---|---|---|---|---|---|
| 17 | HYCAR LX 407, styrene-butadiene, 180 g | ferric oxide 40 g | HF, 3.5 g | lead chromate pigment (KIKUJIRUSHI 5G) 50 g anionic surface active agent (Demol-P) 5 g | water to make 1 liter | 30 |
| 18 | HYCAR LX 407, styrene-butadiene 180 g | FePO$_4$.4H$_2$O 25 g | HF, 3 g | iron oxide red pigment (TENYO NENGARA 501) 40 g anionic surface active agent (Demol-P) 3 g | water to make 1 liter | 16 |
| 19 | HYCAR LX 407, styrene-butadiene, 200 g | Fe(NO$_3$)$_3$.9H$_2$O 5 g | HF, 4 g | quinacridone pigment (Cinquasia Red, DuPont) 20 g nonionic surface active agent (SUN-FREEN, Sansko) 0.2 g | water to make 1 liter | 40 |
| 20 | Goodrite 1800 × 72 styrene-butadiene, 200 g | Fe(NO$_3$)$_3$.9H$_2$O 5 g | HF, 3.5 g | chrome trioxide pigment (CHROME OXIDE GREEN GN, DuPont) 80 g anionic surface active agent 4 g | water to make 1 liter | 35 |
| 21 | Pliolite 491, styrene-butadiene, 160 g | FeF$_3$.3H$_2$O 10 g | HF, 5 g | lead chromate pigment 50 g iron oxide red pigment 40 g surface active agents 5 g | water to make 1 liter | 20 |
| 22 | Synthemal 9404, acrylic copolymer, 200 g | FeF$_3$.3H$_2$O 10 g and Fe(NO$_3$)$_3$.9H$_2$O 5 g | HF, 4 g | lead chromate pigment 50 g iron oxide red pigment 40 g anionic surface active agent 5 g | water to make 1 liter | 43 |
| 23 | HYCAR 2679, acrylic copolymer, 180 g | FeF$_3$.3H$_2$O 10 g | HF, 6 g | lead chromate pigment 50 g anionic surface active agent 5 g | water to make 1 liter | 18 |

It should be noted that the lead chromate pigment used in Examples 17, 21, 22 and 23 is essentially insoluble in the aqueous acidic coating composition. It should be noted also that the composition of Example 17 was allowed to stand for five days prior to immersing the test panels therein.

EXAMPLES 24 AND 25

This group of examples illustrates the adhesive and corrosion resistant properties of coatings formed from compositions within the scope of the present invention and from a composition of the type described in aforementioned U.S. Pat. No. 3,592,699. Clean steel test panels were immersed in the compositions described below for 3 minutes and the coated panels were then dried and cured in an oven at 180° C. for 5 minutes.

| Component | Amount | | |
|---|---|---|---|
| | Ex. 24 | Ex. 25 | Ex. A |
| styrene-butadiene resin (HYCAR LX 407 latex) | 180 g | 180 g | 180 g |
| lead chromate pigment | 50 g | 50 g | 50 g |
| iron oxide red | 40 g | 40 g | — |
| anionic surface active agent (Demol-P) | 5 g | 5 g | 5 g |
| hydrofluoric acid | 3 g | 3 g | 3 g |
| hydrogen peroxide | 2 g | — | 2 g |

-continued

| Component | Amount | | |
|---|---|---|---|
| | Ex. 24 | Ex. 25 | Ex. A |
| water | to make 1 liter | | |

Salt spray corrosion tests, cross-hatch tests, and impact tests were run on representative panels which were coated as described above. The results of these tests are set forth in Table 5 below.

TABLE 5

| Coating Composition | Coating Appearance and Thickness in Microns | Salt Spray Test Results | Impact Test Results | Paint Failure, Cross-Hatch Test Results |
|---|---|---|---|---|
| Ex. 24 | excellent 38 | 2 mm | no failure | none |
| Ex. 25 | excellent 35 | 3 mm | no failure | none |
| Ex. A | good 18 | 3 mm | no failure | none |

As can be seen from Table 5, panels coated in accordance with the present invention have acceptable corrosion resistant and adhesive properties.

EXAMPLE 26

This example shows the thicknesses of coatings formed when steel panels were immersed in a coating composition of the present invention for different periods of time. The panels were cleaned in a conventional alkali metal silicate cleaning solution and then immersed in the composition described below for time periods set forth in Table 6 below.

| Component | Amount |
| --- | --- |
| styrene-butadiene resin (HYCAR LX 407 latex) | 180 g |
| lead chromate pigment (KIKU-JIRUSHI 5 C, manufactured by Kikuchi Kogyo) | 50 g |
| iron oxide red pigment (TENYO NENGARA 501, manufactured by Tone Sangyo) | 50 g |
| anionic surface active agent (Demol-P) | 5 g |
| hydrofluoric acid | 3.5 g |
| water | to make 1 liter |

In formulating the above composition, the lead chromate, iron oxide red, anionic surfactant (Demol-P) and water were first mixed together and milled for 16 hours, after which the resulting mixture was added to a mixture of the styrene-butadiene resin, hydrofluoric acid and water. The pH of the coating composition was 2.8.

After withdrawing the test panels from the composition, they were allowed to stand in air for 3 minutes and were then rinsed with water. The coatings of the panels were thereafter baked in an oven at 180° C. for 10 minutes. The average weights of the coatings are set forth in Table 6 below.

TABLE 6

| Time of Immersion | Coating Weight, mg/ft$^2$ |
| --- | --- |
| 15 sec. | 649 |
| 30 sec. | 803 |
| 1 min. | 1224 |
| 2 min. | 2257 |
| 3 min. | 3544 |
| 5 min. | 5608 |

As can be seen from Table 6, the longer the time of immersion of the panels in the coating composition, the greater the coating thickness.

EXAMPLE 27

This example shows the adherent properties of wet unfused coatings formed by a composition of the present invention and how their adherence improves with time. Steel panels were cleaned in a conventional alkali metal silicate cleaning solution and then immersed in the aqueous coating composition described below for 3 minutes.

| Components | Amount |
| --- | --- |
| styrene-butadiene resin (HYCAR LX 407 latex) | 180 g |
| lead chromate (KIKU JIRUSHI 5G) | 50 g |
| iron oxide (TENYO NENGARA 501) | 50 g |
| anionic surface active agent (Demol-P) | 5 g |
| hydrofluoric acid | 3 g |
| water | to make 1 liter |

In formulating the above composition, the lead chromate pigment, iron oxide pigment, anionic surfactant (Demol-P), and water were first mixed together and milled for 16 hours, after which the resulting mixture was added to a mixture of the styrene-butadiene resin, hydrofluoric acid and water.

After the coated panels were withdrawn from the composition, they were exposed to the air for the periods of time noted in Table 7 and thereafter they were rinsed with water. The panels were then baked in an oven at 180° C. for 10 minutes.

The coatings produced were smooth and uniform. The average thickness of the cured coatings are set forth in Table 7, as are the results of salt spray corrosion tests which involved subjecting the coated panels to 168 hours of salt spray.

TABLE 7

| Elapsed Time* | Coating Thickness in Microns | Scribe Failure in Inches |
| --- | --- | --- |
| 5 sec. | 13 | 1/32 |
| 15 sec. | 17 | 1/32 |
| 30 sec. | 22 | 1/32 |
| 1 min. | 25 | 1/32 |
| 2 min. | 28 | 1/32 |
| 3 min. | 28 | 3/32 |

*time elapsed between withdrawal of coated panels from composition to rinsing thereof with water.

The examples above illustrate a number of different aspects of the present invention. It should be understood that the examples are illustrative and that compositions within the scope of the present invention can be formulated from other materials and/or from amounts of materials other than those shown in the examples. Thus, organic coating-forming materials or resins other than the ones specifically mentioned above can be used. In this connection, it is noted that the specific latices identified above include latices in which the resin dispersion is stabilized by a surfactant system containing principally an anionic surfactant, in which the resin dispersion is stabilized by a surfactant system containing principally a nonionic surfactant, and in which the resin dispersion is stabilized by anionic groups in the polymer chain, the latex being essentially surfactant-free. It is pointed out also that the examples include compositions wherein the amount of fluoride is at least sufficient to combine with all of the dissolved ferric iron and also wherein the amount of fluoride is less than that needed to combine with all of the dissolved ferric iron (this is the case in Example 2). In all of the exemplary compositions, the amounts of fluoride are sufficient to keep the compositions as a whole from being destabilized by the dissolved ferric iron.

In summary, it can be said that the present invention provides an important improvement in the organic coating field.

We claim:

1. An acidic aqueous coating composition for use in coating metal surfaces having a pH of about 1.6 to about 5.0 and comprising solid particles of resin dispersed in said composition, dissolved fluoride, and a ferric iron-containing compound which is soluble in said composition and which is a source of soluble ferric iron, the source of said soluble ferric iron including a source other than said metal surface, and wherein said soluble iron-containing compound is present in an amount such that it releases at least about 0.025 g/l of dissolved ferric iron into the composition, and wherein said ingredients are present in amounts such that the said composition is capable of forming on a metal surface immersed therein and in a substantially electrostatic field-free environment a resinous coating which increases in amount during at least a portion of the time said surface is immersed in said composition.

2. A composition according to claim 1 wherein said iron-containing compound is present in an amount such that it releases into the composition dissolved ferric iron in an amount within the range of about 0.3 to about 1.6 g/l.

3. A composition according to claim 1 wherein said iron-containing compound is selected from the group consisting of ferric chloride, ferric nitrate, ferric fluoride, ferric phosphate, ferric sulfate, and ferric oxide.

4. A composition according to claim 1 which contains hydrofluoric acid.

5. A composition according to claim 1 which contains an oxidizing agent containing oxygen.

6. A composition according to claim 1 wherein said iron-containing compound is present in an amount such that the amount of ferric iron released into the composition is no greater than about 3.5 g/l.

7. An acidic aqueous coating composition prepared from:
(a) an anionically stabilized aqueous resin dispersion;
(b) ferric fluoride in an amount equivalent to about 1 to about 5 g/l of ferric fluoride trihydrate; and
(c) acid; and
wherein the amount of resin dispersion is such that the composition contains about 5 to about 550 g/l of resin solids; and wherein the acid is present in an amount sufficient to impart a pH to the aqueous composition of about 1.6 to about 5.

8. A composition according to claim 7 including hydrofluoric acid.

9. A composition according to claim 8 including an anionic surfactant for stabilizing said resin dispersion.

10. An unused acidic aqueous composition for use in forming a resinous coating on a metallic surface consisting essentially of an aqueous solution having dissolved therein ferric iron and fluoride and having dispersed therein solid particles of resin, the pH of the composition being within the range of about 1.6 to about 5, the amount of resin being within the range of about 5 to about 550 g/l and the amount of dissolved ferric iron being at least about 0.025 g/l.

11. A composition according to claim 10 wherein the amount of dissolved ferric iron is no greater than about 3.5 g/l.

12. A composition according to claim 10 wherein the source of said dissolved ferric iron is a readily soluble ferric iron-containing compound.

13. A composition according to claim 12 wherein said readily soluble compound is ferric chloride, ferric nitrate, ferric sulfate or ferric fluoride.

14. A composition according to claim 10 wherein the source of said dissolved ferric iron is a partially soluble ferric iron-containing compound.

15. A composition according to claim 14 wherein said partially soluble compound is ferric phosphate or ferric oxide.

16. A composition according to claim 10 wherein said resin is selected from the group consisting of styrene-butadiene, acrylic, ethylene-vinyl acetate and polyethylene resins.

17. A composition according to claim 10 wherein said dispersed resin particles are anionically stabilized.

18. A composition according to claim 17 wherein said composition includes an anionic surfactant for maintaining said particles dispersed in the composition.

19. A composition according to claim 10 wherein said composition includes a nonionic surfactant for maintaining said particles dispersed in the composition.

20. A composition according to claim 10 wherein said composition contains hydrofluoric acid.

21. A composition according to claim 10 wherein the source of said ferric iron is ferric fluoride and the acid of said composition is hydrofluoric acid.

22. A composition according to claim 10 including an oxidizing agent containing oxygen in an amount equivalent to about 0.01 to about 0.2 oxidizing equivalent per liter of composition.

23. A composition according to claim 10 wherein said resin particles are anionically stabilized, wherein said source of dissolved ferric iron is ferric chloride, ferric nitrate, ferric sulfate, ferric fluoride, ferric oxide or ferric phosphate and wherein said composition includes nitric, sulfuric, hydrochloric, hydrofluoric, phosphoric, acetic, chloracetic or trichloracetic acid.

24. An acidic aqueous coating composition having a pH within the range of about 1.6 to about 5 and being effective to chemically attack and dissolve metal from a metallic surface immersed therein, said composition containing about 5 to about 550 g/l of dispersed solid particles of resin and dissolved ferric fluoride in an amount equivalent to at least about 0.025 g/l of dissolved ferric iron, wherein said dissolved ferric fluoride is effective in increasing the rate at which metal is dissolved from said surface, and said composition being substantially free of an oxygen-containing oxidizing agent in an amount which effects a further increase in the rate at which metal is dissolved from said surface, and wherein said composition is capable of forming on said surface while immersed therein and in a substantially electrostatic field-free environment a resinous coating which increases in amount during at least a portion of the time said surface is immersed in said composition.

25. A composition according to claim 24 which is capable of dissolving iron from a ferrous metal surface immersed therein.

26. A composition according to claim 25 wherein said particles are anionically stabilized.

27. A composition according to claim 26 wherein said composition includes an anionic surfactant for maintaining said particles dispersed in the composition.

28. A composition according to claim 27 including hydrofluoric acid and wherein the dissolution of said metal surface is effected substantially exclusively by the acid and dissolved ferric fluoride constituents of the composition and wherein said composition includes an anionic surfactant for maintaining said particles dispersed in the composition.

29. An acidic aqueous coating composition which is capable of chemically attacking and dissolving iron from a ferrous metal surface immersed therein, said composition containing about 5 to about 550 g/l of dispersed anionically stabilized resin particles of styrene-butadiene, hydrofluoric acid, the pH of the composition being within the range of about 1.6 to about 5, and ferric fluoride in an amount equivalent to about 1 to about 5 g/l of ferric fluoride trihydrate, said ferric fluoride being effective to increase the rate at which iron is dissolved from said surface, said composition being substantially free of amounts of other materials which would effect a further increase in the rate at which iron is dissolved from said surface, and wherein said composition is capable of forming on a ferrous metal surface immersed therein and in a substantially electrostatic field-free environment a resinous coating which increases in amount during at least a portion of the time said surface is immersed in said composition.

30. A composition according to claim 29 including an anionic surfactant for maintaining said particles dispersed in the composition.

31. A composition according to claim 30 including carbon black pigment.

32. An acidic aqueous coating composition prepared from:
   (a) an aqueous dispersion of solid resin particles;
   (b) acid;
   (c) ferric iron-containing compound; and
   (d) a fluoride-containing compound;
wherein said composition has a pH of about 1.6 to about 5; wherein each of said compounds ((c) and (d)) are soluble in the composition, said iron-containing compound is present in an amount such that it releases into the composition dissolved ferric ion in an amount of at least about 0.025 g/l, and wherein said ingredients are present in amounts such that said composition is capable of forming on a metal surface immersed therein and in a substantially electrostatic field-free environment a resinous coating which increases in amount during at least a portion of the time said surface is immersed in said composition.

33. A composition according to claim 32 wherein the amount of said fluoride is at least sufficient to combine with all of said dissolved ferric iron.

34. A composition according to claim 32 including about 5 to about 30 g/l of coalescing agent.

* * * * *